US007746244B2

(12) United States Patent
Wouters

(10) Patent No.: US 7,746,244 B2
(45) Date of Patent: Jun. 29, 2010

(54) PROGRAMMABLE REMOTE CONTROL AND METHOD FOR PROGRAMMING A PROGRAMMABLE REMOTE CONTROL, A READABLE MEMORY AND A PROGRAM

(75) Inventor: Johan Agnes Emile Wouters, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 634 days.

(21) Appl. No.: 10/509,238

(22) PCT Filed: Feb. 27, 2003

(86) PCT No.: PCT/IB03/00830

§ 371 (c)(1),
(2), (4) Date: Sep. 24, 2004

(87) PCT Pub. No.: WO03/083801

PCT Pub. Date: Oct. 9, 2003

(65) Prior Publication Data

US 2005/0151726 A1 Jul. 14, 2005

(30) Foreign Application Priority Data

Mar. 29, 2002 (EP) .................................. 02076225

(51) Int. Cl.
*H04L 7/00* (2006.01)

(52) U.S. Cl. ................ 340/825.2; 340/5.1; 340/825.22; 340/825.72; 340/426.13

(58) Field of Classification Search ............ 340/825.22, 340/825.69, 825.72, 5.22, 5.27, 5.1, 5.2, 340/5.21, 825.2, 426.13; 341/176, 175, 20, 341/21, 22; 345/172, 173; 398/106
See application file for complete search history.

(56) References Cited

U.S. PATENT DOCUMENTS

| | | | | |
|---|---|---|---|---|
| 5,457,478 | A * | 10/1995 | Frank | 345/158 |
| 5,614,906 | A * | 3/1997 | Hayes et al. | 341/176 |
| 6,133,909 | A * | 10/2000 | Schein et al. | 715/721 |
| 2001/0017615 | A1* | 8/2001 | Lin et al. | 345/173 |

* cited by examiner

*Primary Examiner*—Vernal U Brown

(57) ABSTRACT

A remote control comprises object keys and a selector for linking preset IR or RF code sets to the object keys. The remote control comprises: —a selector for the selection of an IR or RF preset code set by a user, —an activator for the activation of one or more links between an element of said preset IR or RF code set and an object key by the user after the selection, —a selector for the subsequent selection of a further preset code set by the user and —repeat means for repeating the steps a and b for the further preset code set until all object keys have been linked or the user terminates the process. This allows the user to combine more than one preset code set into a single code set.

20 Claims, 8 Drawing Sheets

PROGRAMMABLE REMOTE CONTROL AND METHOD FOR PROGRAMMING A PROGRAMMABLE REMOTE CONTROL, A READABLE MEMORY AND A PROGRAM

FIELD OF THE INVENTION

The invention relates to a remote control device comprising object keys, a selector for linking preset IR or RF code sets to the object keys to thereby enable the user to control functions of a device to be controlled via the remote control. The operations of said remote control device is based on the following principles.

The remote control device (hereinafter sometimes also called 'remote control') usually has one mode or a plurality of modes (in which case it forms a multi-mode remote control), each mode being dedicated to a specific device to be controlled (TV, VCR, STB, . . . ), hereafter referred to as a device. Each mode has its own dedicated set of IR or RF codes (commands). The device has a selector (which may comprise hardware and/or software alone or in combination) to attribute the code set data (linking) to the buttons (or, more in general, object keys) on the remote control device. Such sets of IR or RF codes are herein referred to as code sets. The invention also relates to a method for programming a remote control.

BACKGROUND OF THE INVENTION

A wide variety of different devices, all having there own device code set to be able to control all features of a device to be controlled, are commercially available.

Due to limited code set storage possibilities, numerous look-a-like device code sets are combined into one remote control code set. Combining these device code sets is a compromise between space and correctness of the code set. Consequently, the user is confronted with certain buttons (object keys) of a code set that might not have the desired effect on the device (no effect or wrong behavior).

It is for this reason that for one brand of a device most of the time multiple preset code sets are proposed by suppliers. The user has the possibility to try out, using the remote control, all the proposed preset code sets and pick the one that fits the best. In many cases, however, none of the proposed preset code sets includes all IR or RF codes for all features of the device and, as a result, the user cannot make full use of the capabilities of the device he/she is trying to control while using the remote control.

SUMMARY OF THE INVENTION

It is an object of the invention to provide a remote control device as described in the opening paragraph which increases the capabilities of control of the devices to be controlled by the remote control.

To this end the remote control device is characterized in that it is arranged to enable combination of a number of preset code sets into a single code set, and comprises:

a. a selector for the selection of a preset code set by a user, b. an activator for the activation of one or more links between an element of said preset IR or RF code set and an object key by the user after the selection, c. a selector for the subsequent selection of a further preset code set by the user, and d. repeat means for repeating a and b for the further preset code set until all object keys have been linked or the user terminates the process.

Element a, the selector, and the selection by the user of such a preset code set are also present in the known remote controls as explained above. However, as explained, such selection often is imperfect, leaving object keys which do not have the desired effect on the device (no effect or wrong behavior).

The remote control in accordance with the invention enables a user to pick IR or RF codes from different code sets to be combined in a single mode. In other words, the user himself compiles a code set in such a way that all of the features of his device (or as many of the features as he likes to control) can be controlled. In the device of the invention a further preset code set is selected, and one or more of said object keys may be activated; this process is repeated until all object keys have been activated or the user terminates the process. Within the framework of the invention 'combining' means that a combination of preset code sets can be formed, by combining parts of several preset code sets. It may be a combination of any number of preset code sets.

This results in the programming of one mode of a universal remote control with data from more then one preset code set, without, however, the user requiring intricate knowledge of programming techniques or access to a computer. Nor do the fundamental data have to be changed, since the preset code sets themselves remain unchanged as are the links between the content of the IR or RF code sets and the object keys. Thus, apart from the advantage to the end user, the invention offers an advantage for the suppliers of universal data bases. Because of the limitations of the user interface the suppliers were obliged to organize their database so as to be code set based instead of command based.

Within the framework of the invention 'object keys' are to be understood to encompass any functional element on the remote control by which the user can activate or change a certain function of the device (TV, DVD, VCR, etc.) to be controlled. Some examples of such 'object keys' are for instance, simple buttons or designated areas of a touch screen (touch screen buttons); however, they may also be voice commands in cases where the remote control can be voice controlled. Such object keys may be a piece of hardware or software or a combination of hardware and software.

Preferably, the remote control device comprises storage means for storing preset IR or RF code sets, and in the steps a and c the preset code set and the further preset code set are selected from the preset code sets in the storage means of the remote control. In such embodiments the information (data) of the IR or RF code sets resides in the remote control device itself, i.e. in the storage means of the remote control. Alternatively, but within the broadest scope of the invention, the IR or RF code sets may be present in a storage means (data base) separate from the remote control per se, for instance, a PC or internet site, the remote control then having linking means to make a link to the preset code set in the separate data base. The selection and linking process etc. remains essentially the same. An advantage of such embodiments is that the number of possible IR or RF code sets to choose from can be greatly increased. However, the disadvantage is that the remote control has to be in constant, fast and errorless communication with the separate data base. At present such high quality of communication is difficult or costly to guarantee. However, on the one hand developments will lead to improvements in wireless communication between portable devices and data bases and on the other hand the number of different devices to be controlled by the remote control increases, and hence the inventor expects the disadvantages of the above embodiments of the invention become less and the advantages greater.

Preferably, the remote control device is a multi-mode remote control, i.e. a mode control that is designed to operate (control) a number of different devices (TV, DVD, VCR). Although this represents a preferred embodiment of the invention, it is to be noted that the invention is also very useful for remote controls that are designated for one type of device (for instance, a TV or DVD, etc.), but are universal in the sense that they can control many or all different brands and types of TVs or DVDs etc.

Preferably, the remote control comprises a proposer for proposing a preset code set to a user prior to the step a (selection of a preset code set).

Proposing a preset code set to the user enables the user to more quickly find the preset code set which likely has the most 'useful' elements. This improves the speed and efficiency of the linking process.

Within the framework of the invention a 'proposer' may be formed by hardware, such as a circuit or a part or parts of circuits, and/or software, such as programs or parts of programs, alone or in combination, thus enabling a preset code set to be proposed to the user. Such proposal may by in visual form (one or more preset code sets are indicated on a touch screen, for instance) or, for instance, by means of sound.

Preferably, the remote control device comprises a verification means for showing, in between the selection of a preset code set (a) and the activation of links (b), the effect of linking.

Showing may take the form of indicating the effect of linking, for instance, by displaying the function. The remote control may show a message 'this button will control sound', or simply indicate 'sound' on the button; this is possible by way of touch screens. Alternatively, or in addition, the verification means may be arranged to allow the user to try out the button.

Preferably, the remote control comprises a further proposer for proposing a further preset code set prior to the step c (selection of a further preset code set). This further proposer may be different from the previously described proposer, but it may also be the same or share parts of hardware or software.

Preferably, the remote control comprises a communicator to communicate, after the step b, unlinked object keys to the user.

Within the framework of the invention a 'communicator' may be formed by hardware, such as a circuit or a part or parts of circuits, and/or software, such as programs or parts of programs, alone or in combination, thus enabling a preset code set, to be proposed to the user. Such communication may be in visual form (one or more preset code sets, i.e. the as yet unlinked ones, are highlighted on a touch screen, for instance) or, for instance, by means of sound.

Communication of the yet unlinked keys enables the selection and linking process to be more efficiently performed.

The remote control preferably comprises a touch screen which enables easy proposal and/or selection of preset code sets, easy activation of links between data and object keys and easy communication in general between remote control and user.

The storage means of the remote control may be or comprise a piece of hardware (such as a circuit or a part of a circuit or a data storage medium) or software (such as a program or a part of a program or a software data bank).

In an embodiment the remote control comprises means to store IR or RF code sets from outside the remote control in the storage means of the remote control. In such embodiments the user may down-load IR or RF code sets (either in a wireless fashion or by a link to, for instance, the internet) from outside the remote control into the storage means. This allows for 'up-dating' of the data stored in the storage means.

In the method in accordance with the invention data of more than one preset code set of a remote control are combined into a single IR or RF code set by carrying out the following steps:

a. selection of a preset code set by the user, b. activation of links between an element of said preset IR or RF code set and an object key, after which c. a further preset code set is selected by the user and the steps a and b are repeated for the further preset code set until all object keys have been linked or the user terminates the process.

Preferably, the method in accordance with the invention comprises the following step which is carried out prior to the step a:

a'. proposal of a preset code set to the user by the remote control.

Preferably, the method in accordance with the invention comprises the following step, prior to the step c:

c'. proposal of a further preset code set to the user by the remote control.

More preferably the method in accordance with the invention comprises the following step prior to the step c and/or c':

c". communication of unlinked object keys to the user by the remote control.

The invention also relates to a programmable remote control device comprising object keys and a memory, said memory comprising means for storing a number of preset IR or RF code sets, and also comprising an executable program or set of programs, said program or set of programs comprising:

a program code for the selection of a stored preset IR or RF code set by a user, the linking of an element of said preset IR or RF code set and an object key upon activation by the user, and a program code for the subsequent selection of a further preset code set by the user and program code for repeating the steps a and be for the further preset code set until all object keys have been linked or the user terminates the process.

The invention also relates to a readable memory for use in a programmable remote control device as well as to a program or set of programs for use in a programmable remote control device.

Such readable memories as well as the program or set of programs, whether they are stored in a memory (which can be an interchangeable part of the remote control device), or on a readable medium (such as disc or CD) or are transmitted in a wireless manner (for instance, taken from the internet), also form embodiments of the invention.

These and other aspects of the invention are apparent from and will be elucidated with reference to the embodiments described hereinafter.

BRIEF DESCRIPTION OF THE DRAWINGS

In the drawings:

FIG. 1 illustrates the invention in a general manner,

FIG. 2 shows, by way of example, the opening menu displayed on a touch screen of a remote control, FIG. 3 shows the next screen in the menu, and FIGS. 4 to 13 show subsequent screens.

The Figures are not drawn to scale. Generally speaking, identical components are denoted by the same reference numerals in the Figures.

DETAILED DESCRIPTION OF PREFERRED EMBODIMENTS

Figure 1:
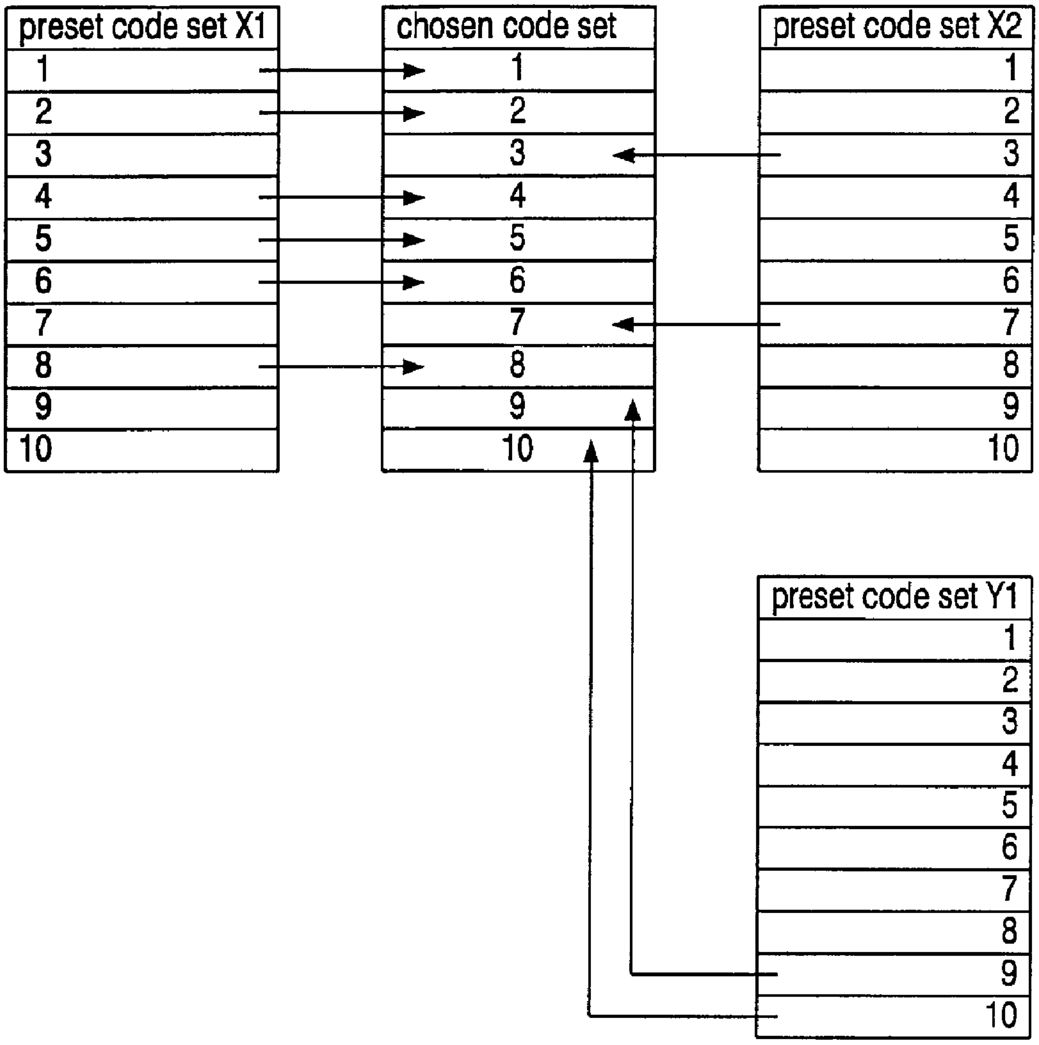
FIGS. 1 to 13 illustrate the remote control in accordance with the invention by means of steps of a method for programming the remote control. Therein.

FIG. 1 illustrates the invention. It is schematically indicated that the remote control comprises several preset IR or RF code sets (usually in a software form), here shown as a preset code set X1 (brand X, IR or RF code set 1), a preset code set X2 (brand X, IR or RF code set 2) and a preset code set Y1 (brand Y, IR or RF code set 1). Said preset code sets may be present in the device as bought by the consumer and/or the remote control device has a storage means which can be filled with said preset code sets, for instance, by downloading. A combination is also possible wherein a number of preset code sets are prestored, but the remote control device still offers the possibility to increase the number of preset code sets. The latter may be very useful since it would allow the 'up-dating' of the remote control with novel preset IR or RF codes for novel types of devices or even novel devices. In yet a further embodiment within the overall scope of the invention the remote control device comprises a link to an IR or RF preset code set in a separate data bank.

It is schematically indicated that after the combination process for combining data from several preset code sets into a single code set (herein named 'chosen code set'), the object keys 1, 2, 4, 5, 6 and 8 are linked to data (commands) from the preset code set X1, the object keys 3 and 7 are linked to data (commands) from the code set X2, and the object keys 9 and 10 are linked to data (commands) from the code set Y1. The chosen code set is a compilation, compiled by the user, in which data from the preset code sets X1, X2 and Y1 are combined in a single code set. All object keys are functional and the function they perform can be checked by the user before compiling. This greatly increases the usefulness of the device without, however, requiring additional data sets other than the preset data sets or requiring a high level of programming expertise on the part of the user.

The invention will be further elucidated hereinafter by means of an example.

Example

Defining the Code set of Your Devices

A Remote Control uses RC (Remote Control) codes to activate devices. Because there are several brands using specific RC codes, the user has to define the brands of his/her devices.

Figure 2:
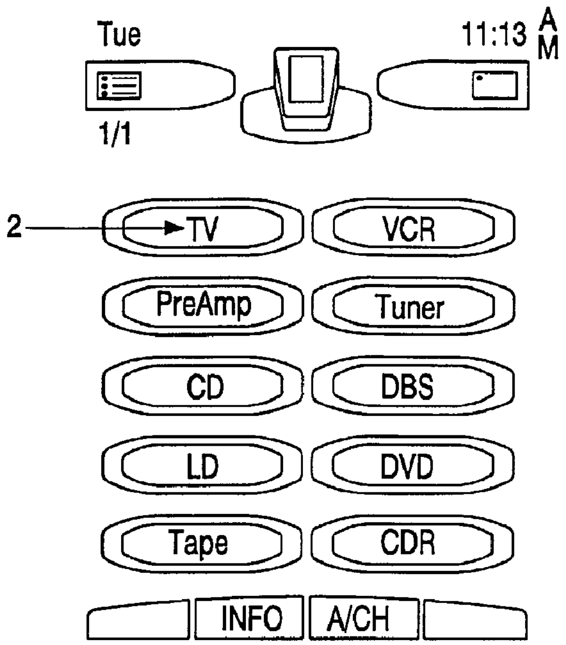
Figure 3:
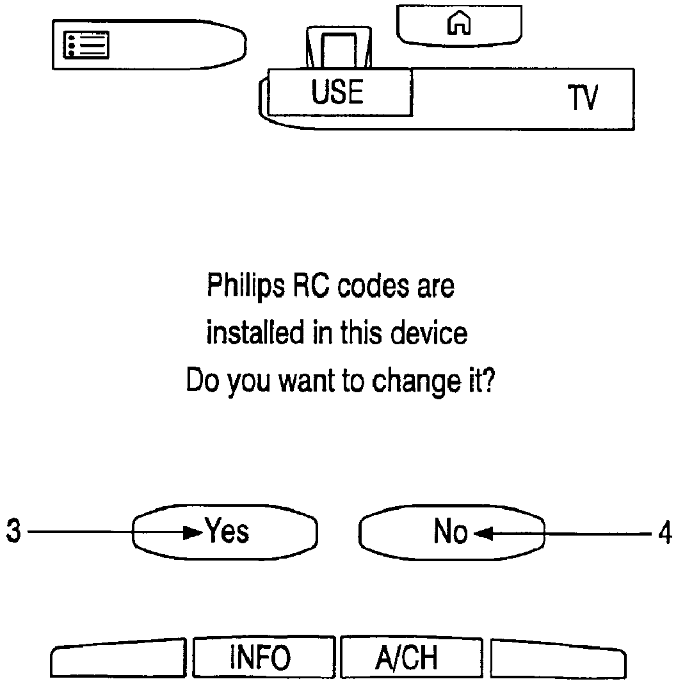

FIG. 2 shows a starting screen of the menu on a remote control. This starting screen is referred to hereinafter also as 'Home panel'. This example is a preferred embodiment in which the remote control is provided with a touch screen for easy interaction between the remote control and the user. On the Home panel buttons are shown for most common video and audio devices (FIG. 2). 'Buttons' are also called 'object keys' within the framework of this invention. By pressing a button a certain action is initiated. In the case of a touch screen 'pressing' includes 'touching'. When a selection of a device is made by touching or pressing a button shown on the touch screen of the remote control on the Home panel for the first time, the Remote Control will likely be set up by default to operate on a particular brand (usually the same as the brand of the supplier of the universal control), in this example being Philips devices. For all devices other than Philips, the brand will have to be defined before they can be operated with the Remote Control. FIG. 3 shows a type of screen that could be shown. In this example it is assumed that the language used is English; the remote control may start the menu with a screen prior to the Home panel in which the user may define the language (English, German, Japanese, Chinese, French, Spanish, etc.).

The user selects a device on the Home panel by pressing a button on the home panel, in this case a TV is selected by pressing the 'TV' button 2.

The screen as shown in FIG. 3 then appears in which it is stated that a particular brand RC code has been installed in the device and whether or not one wishes to change this.

When the brand of the TV is indeed the indicated brand, the user clicks No, whereafter the Remote Control will switch to the Use mode to operate the device in the Use mode, or when the user wishes to adjust the Remote Control to operate with a particular brand, the user clicks Yes.

Figure 4:
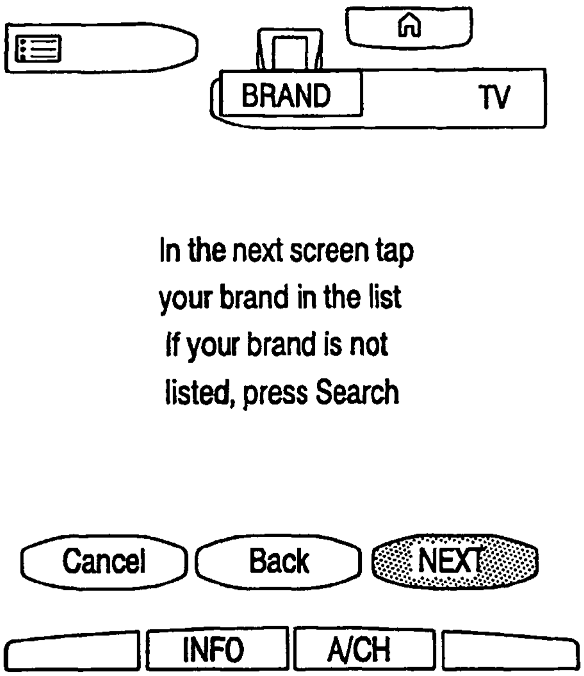

The Remote Control will then switch to the Brand mode (via, for instance, the screen shown in FIG. 4), enabling a selection of Brands and Code Sets when the next button is clicked, after which a screen as schematically shown in FIG. 4 appears.

Figure 5:
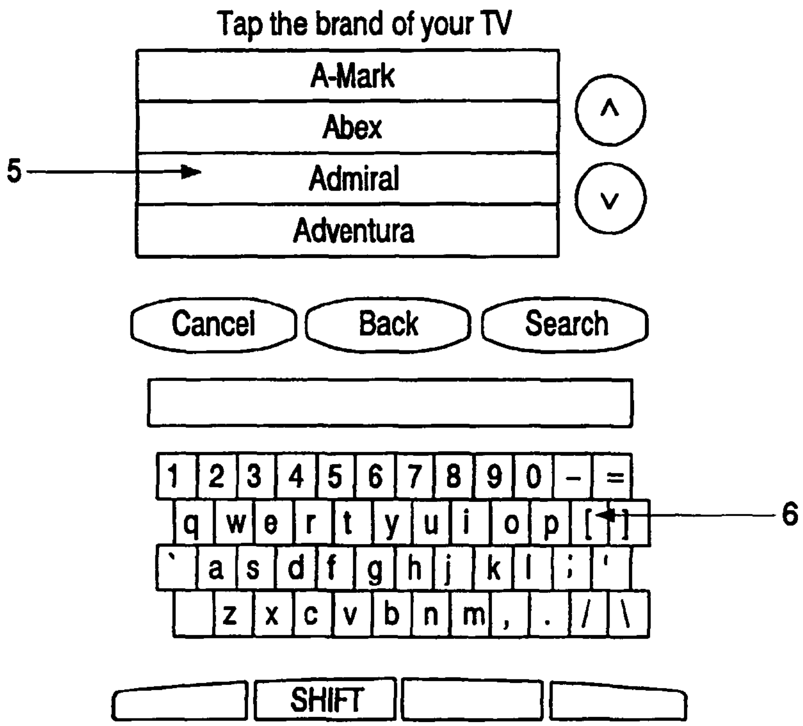

A list of brands and their corresponding RC codes are stored in the Remote Control's memory, enabling the selection of a particular brand from a list 5 (FIG. 5). Because not every device of a certain brand uses the same RC codes, the user may also have to select a set of RC codes for his/her brand A scrollable list of brands 5 for the selected device and a "virtual auto-zooming" mini-keyboard appears. The user then navigates through the list of brands using the scroll buttons and to scroll up or down in the list of brands.

Scrolling through the brands one by one is possible by tapping the scroll buttons.

The scrolling speed is increased by holding down the scroll buttons.

The user will subsequently select a brand in the list (see FIG. 6) in which the selected brand is highlighted. The Search button switches to Next.

The user will then tap Next.

When the selected brand uses only one set of RC codes, the Remote Control switches to Try mode, i.e. a mode in which the user may try out what the various buttons stand for. Alternatively, the 'try-out' mode may be a 'show-the-user-what-is-what' screen in which the functions are indicated on the buttons.

Figure 7:
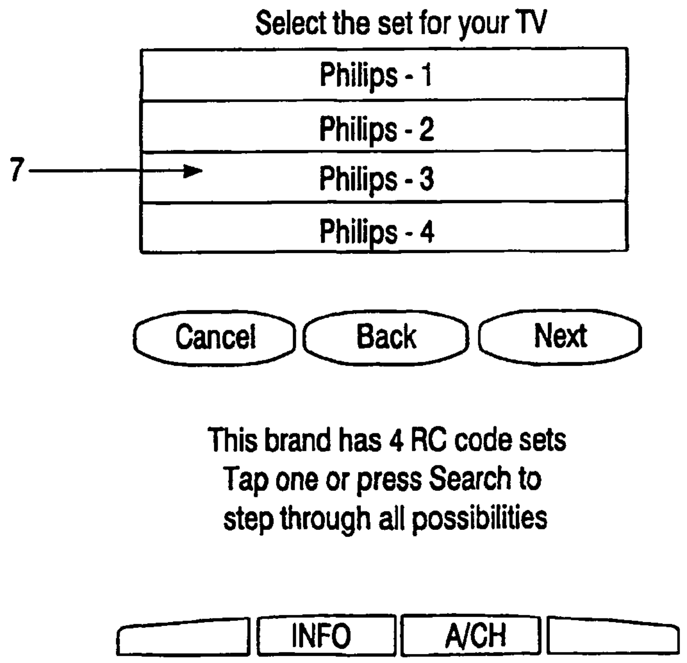

When there are several code sets for the selected brand, a list 5 of code sets may appear for the selected brand (FIG. 7).

It is also possible to select the code set for the particular device as follows:

Select a code set from the list 5.

Preferably, the RC code sets are ranked in the list proposed by the device, the first RC code set in the list being used for most devices of the selected brand.

Figure 6:
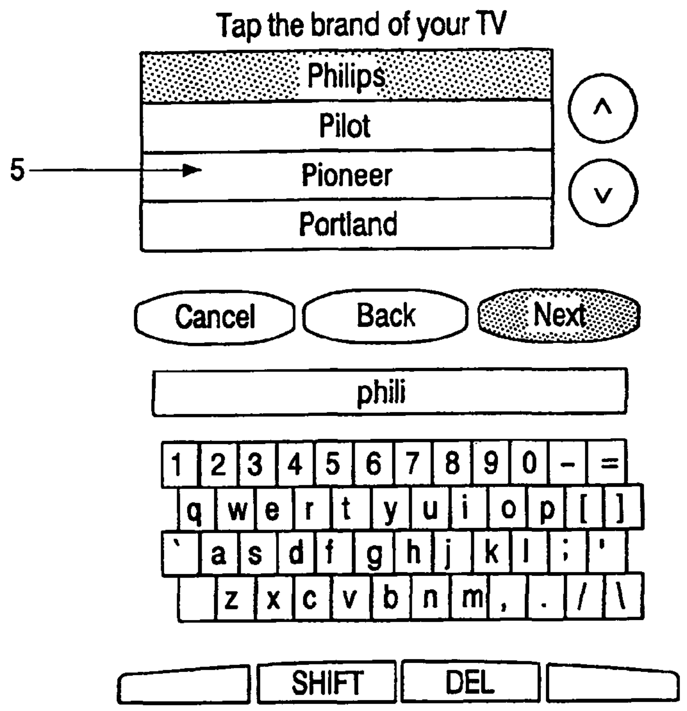

The selected code set is highlighted (FIG. 6). The Search button switches to Next.

Tap Next.

Figure 9:
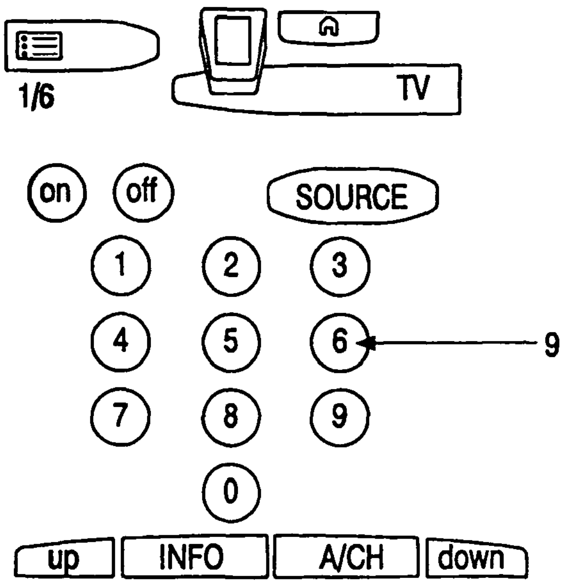

The Remote Control switches to the Try mode. Continue with the step illustrated in FIG. 9. FIG. 9 shows the device control panel; the user can try one or more buttons. The first control panel of the selected device is displayed and the user may try out a button on the control panel and check if the device responds to the RC code being sent by the Remote Control. After the key has been pressed, the next screen will appear (FIG. 10).

Figure 10:
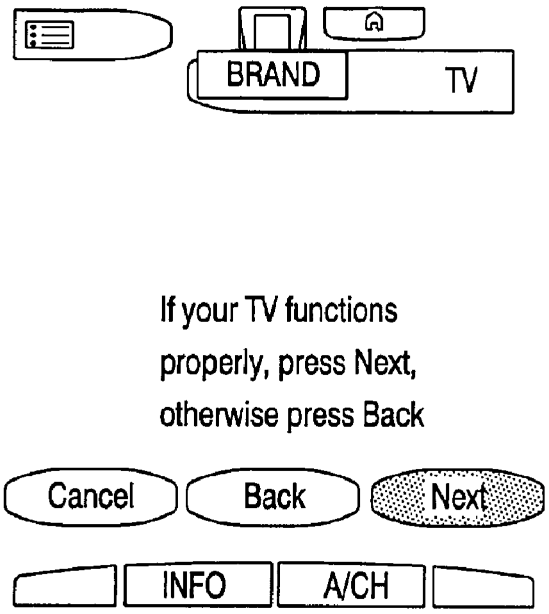
Figure 11:
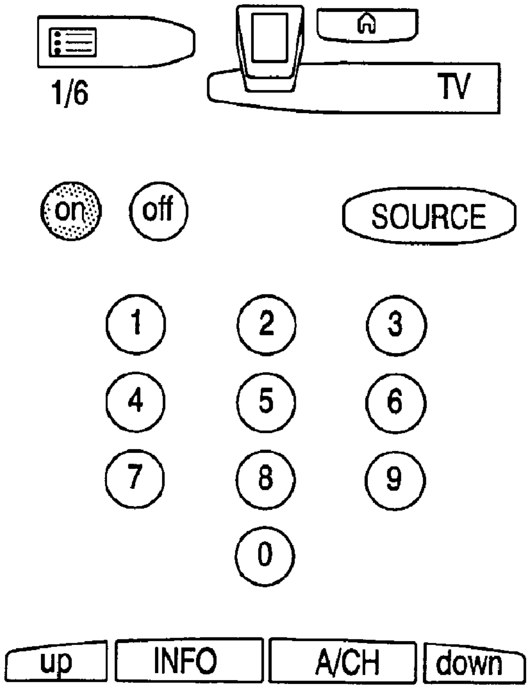

When not satisfied with the selected RC code, the user taps on the 'Back' object key which will bring him back to the step illustrated in the FIGS. 9 and 11 (FIG. 11 shows the repeat step of FIG. 9); he/she can try the next button and then continue with the step illustrated in FIG. 10, or when satisfied with the way the device is responding to the selected RC code, the user taps Next and the code for that particular pressed button (object key) will be installed (activated). On the control panel the installed button will preferably change color (or be highlighted) to communicate to the user which key(s) is (are) already installed. The user then tries the next button and continues as from the step illustrated in the FIGS. 9 and 11.

Figure 12:
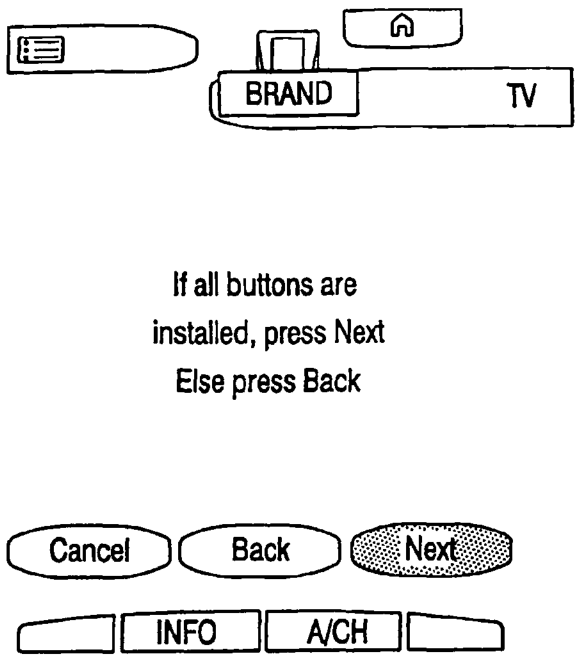
Figure 13:
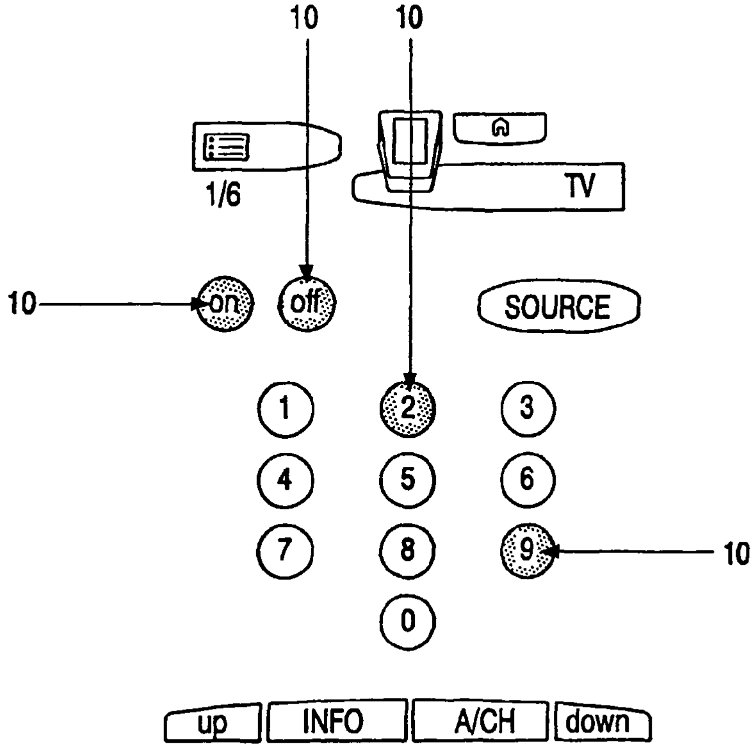

When all buttons on the control panel have been tried, the next screen appears (FIG. 12).

Figure 8:
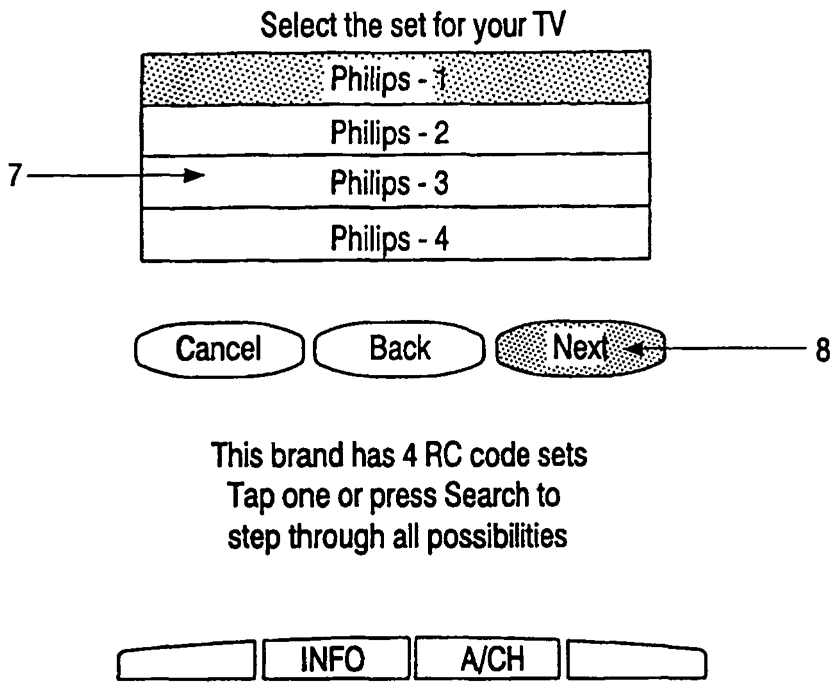

When all buttons have given a satisfactory response, the user taps Next and the device is now fully installed and the user continues by defining other devices on the Home panel (for instance, when use is made of a multi-mode remote control device) or terminates the process, or when some buttons did not give a satisfactory response, the user taps Back after which the remote control will again propose selection of a new brand from the list (FIGS. 5 to 7). Alternatively, the user may directly select a brand from the list. This new brand will only have an effect on those buttons that were not installed in the last steps (steps illustrated in the FIGS. 9 to 11). For selecting the brand the same procedure may be used as illustrated by the FIGS. 5 to 8. After passage of the last step (FIG. 8), the control panel (FIG. 9) appears again. This time the buttons that were already installed in previous steps are preferably already indicated in a different color or highlighted in another manner. The remote control will only request for the left-over buttons to be installed.

For these buttons, or more in general object keys, the user then continues the steps illustrated in the FIGS. 9 to 13. If after said iteration all buttons have been installed (activated) the process is stopped; if not, this iteration will be repeated until all buttons have been installed.

This iterative procedure will lead to activation (installing) of all object keys, or at least as many objects keys as the user wishes to install, said object keys also having the functions the user wishes said keys to have. After activation of all object keys (or as many object keys as the user wishes to install), the chosen code set is finished. Preferably, the remote control device comprises a fixer (which may be hardware or software or a combination thereof) to fix the chosen code set (i.e. enter it into the RC code set data base) and give it a name ('user 1', for instance). When the remote control malfunctions (for instance, when the batteries have been exhausted), the user may easily reinstall the chosen code set by choosing 'user1' from the proposed list or immediately selecting 'user1 '. When reinstalling, the remote control will preferably start the process by proposing the previously chosen code sets (user1, user2, etc.).

The installing process may be repeated for other devices (DVD-player, for instance) until all other devices on the Home panel the user wishes to operate are properly installed. Preferably, the proposer of the remote control device comprises means to fine-tune the list of proposed RC code sets (list 5) for a device to be installed on the basis of the previously chosen code sets. The following example may be given: when a consumer has installed a chosen code set for a high-end consumer product, such as, for instance, for a PDP display, it is likely that he/she will also have a high-end DVD device or other high-end device. The proposer of the remote control will then put high-end RC code sets (i.e. code sets associated with high-end devices) at the top of the list of selectable code sets, rather than the RC sets of the most widely used devices of the specific brand. When a person has previously installed a code set for a low-end device, the proposer will put also 'low-end' code sets on top of the lists for other devices.

Figure 14:
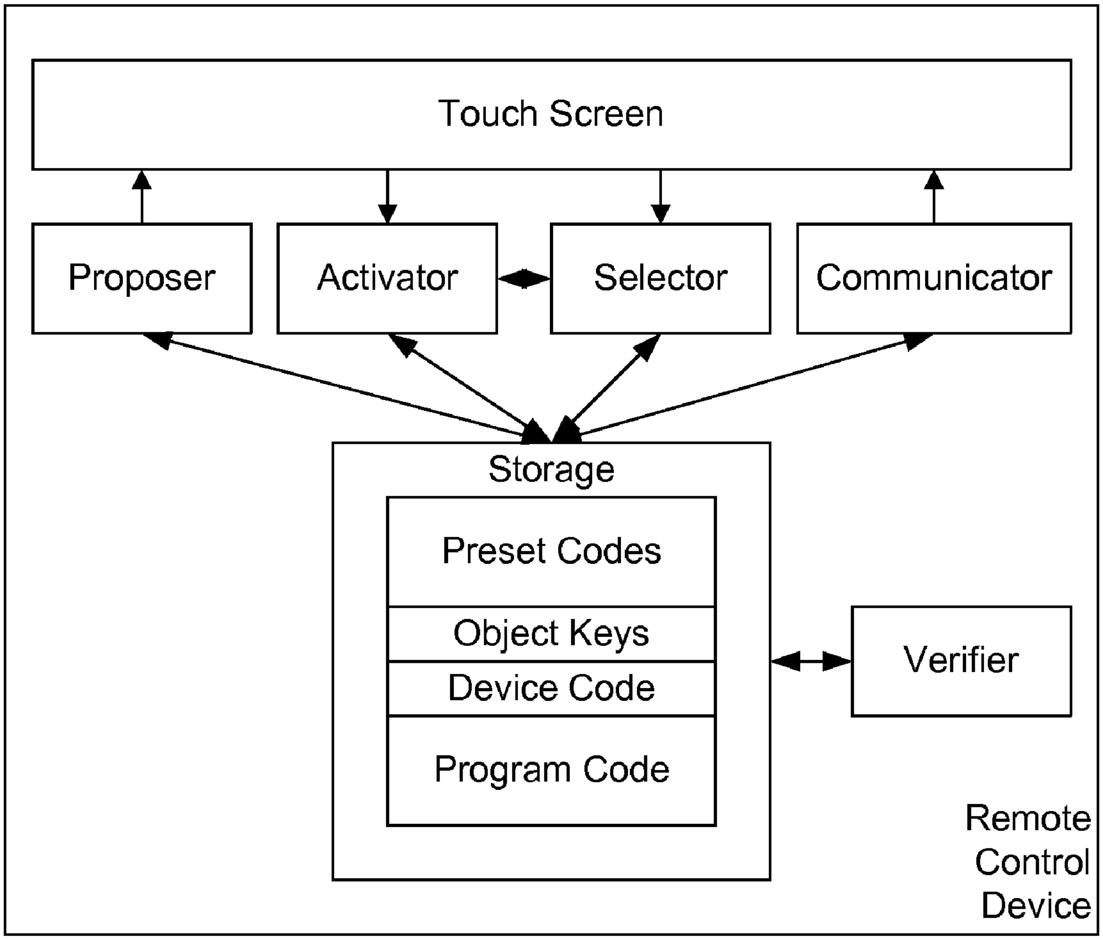
FIG. 14 illustrates a remote control device according to another embodiment of the invention.

FIG. 14 illustrates a remote control device comprising object keys, a selector for linking preset IR or RF code sets to the object keys to thereby enable the user to control functions of a device to be controlled via the remote control, wherein the remote control device is arranged for enabling combination of a number of preset IR or RF code sets into a single device code set for controlling the device. The remote control device includes a selector for the selection of an IR or RF preset code set and one or more further preset code sets by a user, an activator for the creation of one or more links between an element of the preset IR or RF code set and an object key by the user after the selection. As discussed above, the remote control device is configured to repeat the selection and creation for the further preset code set for controlling the device to be controlled until all object keys have been linked or the user terminates the process. The remote control device preferably includes a communicator to communicate remaining unlinked object keys to the user. To facilitate selection of the preset code sets, the remote control also includes a proposer for proposing the preset code set and/or the further preset code sets. Also in a preferred embodiment, the remote control device includes a verifier that is configured to show, in between the selection of a preset code set and the creation of links, an effect of the linking. As illustrated, the remote control device includes storage for storing preset IR or RF code sets, an identification of the object keys, and the resultant links that define the single device code set for controlling the device.

The above described functional blocks of FIG. 14 are preferably embodied as program code in storage of the device that causes a processor (not illustrated) to effect the corresponding functions.

While the invention has been described in connection with preferred embodiments, it will be understood that modifications thereof within the principles outlined above will be evident to those skilled in the art, so that the invention is not limited to the preferred embodiments but is intended to encompass such modifications. Modifications include inter alia any and each combination of the above features and characteristics even if not explicitly described in the claims.

Any reference signs do not limit the scope of the claims. The word "comprising" does not exclude the presence of elements other than those listed in a claim. Use of the word "a" or "an" preceding an element does not exclude the presence of a plurality of such elements The invention can be summarized as follows:

A remote control comprises object keys and a selector for linking preset IR or RF code sets to the object keys. The remote control comprises:

a selector for the selection of an IR or RF preset code set by a user, an activator for activation of one or more links between an element of said preset IR or RF code set and an object key by the user after the selection, a selector for subsequent selection of a further preset code set by the user, and repeat means for repeating a to b for the further preset code set until all object keys are linked or the user terminates the process.

This allows the user to combine more than one preset code set into a single code set.

The invention claimed is:

1. A remote control device for controlling one or more consumer devices of various device types, the remote control comprising:

- a chosen code set having a plurality of cells, each cell being capable of including at least one function for controlling at least one consumer device;
- a plurality of object keys each having an assignment to at least one of the plurality of cells and capable of activating the at least one function included in the cell;
- a plurality of preset code sets, each having a plurality of functions for controlling at least one consumer device and including one or more functions provided by a third party;
- a selector for selecting functions from the preset code sets appropriate for controlling the one or more consumer devices; and
- an activator configured for creation of one or more links between at least one of the selected functions of the plurality of preset code sets and cells of the chosen code set assigned to an object key.

2. The remote control device as claimed in claim 1, comprising storage that is configured to store the plurality of preset code sets, and the chosen code set.

3. The remote control device as claimed in claim 1, wherein the remote control device is a multi-mode remote control.

4. The remote control device as claimed in claim 1, comprising a proposer for proposing one of the plurality of preset code sets prior to the selection by the selector.

5. The remote control device as claimed in claim 1, comprising a verifier that is configured to show, in between the selection by the selector and the creation of links by the activator, an effect of linking.

6. The remote control device as claimed in claim 1, comprising a proposer for proposing the chosen code set prior to the selection by the selector, wherein the proposer is configured to change an order of proposed code sets based on a previously selected proposed code set.

7. The remote control device as claimed in claim 1, comprising a communicator to communicate remaining unlinked object keys to the user.

8. The remote control device as claimed in claim 1, comprising a touch screen.

9. The remote control device as claimed in claim 1, comprising storage that is configured to store functions from outside the remote control device in the storage of the remote control device.

10. A method for programming a remote control device having a plurality of object keys for controlling one or more consumer devices of various device types, the method comprising acts of:

- combining a plurality of preset code sets provided for a first device type into a single first code set for the consumer device to be controlled, the consumer device corresponding to the first device type, each preset code set having a plurality of functions for controlling at least one consumer device, the chosen code set having a plurality of cells, each cell being capable of including at least one function for controlling at least one consumer device;
- selecting a function from one of the plurality of preset code sets; and
- creating links between one of the selected functions of any one of the plurality of preset code sets provided for a given device type and cells of the chosen code set assigned to an object key, wherein each of the plurality of object keys having an assignment to at least one of the plurality of cells and is capable of activating the at least one function included in the cell.

11. The method for programming a remote control device as claimed in claim 10, comprising an act of proposing one of the plurality of preset code sets to the user by the remote control device.

12. The method for programming a remote control device as claimed in claim 10, comprising an act of ordering the plurality of preset code sets proposed to the user based on a previously selected code set.

13. The method for programming a remote control device as claimed in claim 10, comprising an act of communicating unlinked object keys to the user by the remote control device.

14. The method for programming a remote control device as claimed in claim 10, wherein the remote control device includes storage and preset code sets are transferred from a device outside the remote control device so as to be stored in the storage of the remote control device.

15. The method for programming a remote control device as claimed in claim 14, comprising an act of storing preset code sets.

16. A programmable remote control device comprising object keys for controlling one or more consumer devices of various device types and a memory, the memory being configured to store a plurality of preset code sets, and comprising program of instructions for performing the method comprising acts of:

- combining a plurality of preset code sets provided for a first device type into a chosen code set for the consumer device to be controlled, the consumer device corresponding to the first device type, each preset code set having a plurality of functions for controlling at least one consumer device, the chosen code set having a plurality of cells, each cell being capable of including at least one function for controlling at least one consumer device;
  - selecting a function from one of the plurality of preset code sets; and,
  - creating links between one of the selected functions of any one of the plurality of preset code sets provided for a given device type and cells of the chosen code set assigned to an object key wherein each of the plurality of object keys having an assignment to at least one of the plurality of cells and is capable of activating the at least one function included in the cell.

17. The programmable remote control device as claimed in claim 16, comprising a program code for proposing one of the plurality of preset code sets.

18. The programmable remote control device as claimed in claim 17, comprising a program code for ordering the plurality of preset code sets based on a previously selected code set.

19. The remote control device as claimed in claim 1, wherein the remote control device is configured to prompt the user to repeat the selection of the functions and creation of one or more links for the chosen code set for controlling the consumer device.

20. The method for programming a remote control device as claimed in claim 10, comprising an act of prompting repeating of the selecting and creating acts for the chosen code set for controlling the consumer device.

* * * * *